Figure 1:
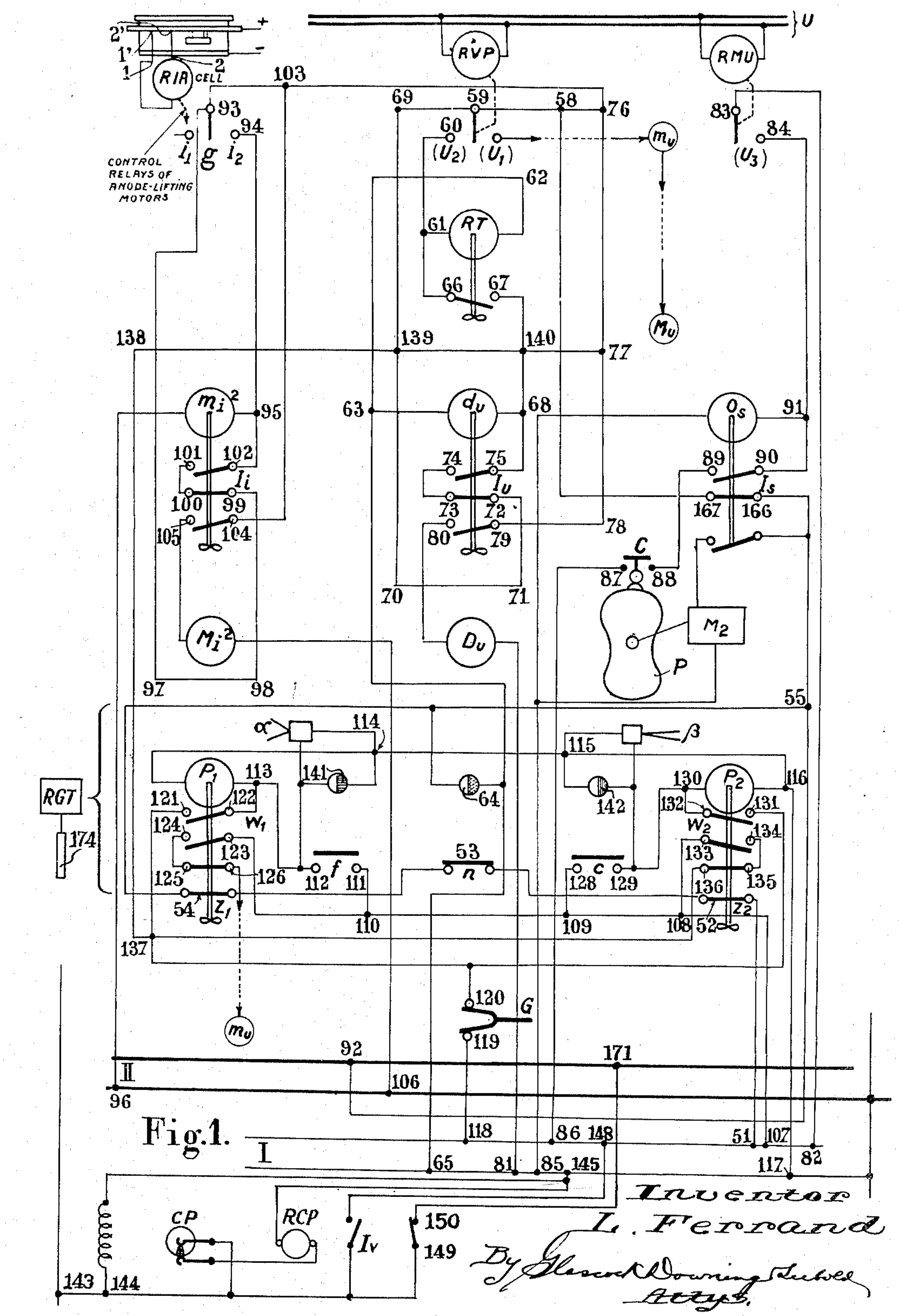

Jan. 17, 1956 L. FERRAND 2,731,412

FUSED SALT ELECTROLYTIC CELLS

Filed May 22, 1951 2 Sheets-Sheet 1

Inventor
L. Ferrand
By Glascock Downing & Seebold
Attys.

Inventor
L. Ferrand
By Glascock Downing & Seebold
Attys.

United States Patent Office 2,731,412
Patented Jan. 17, 1956

1

2,731,412

FUSED SALT ELECTROLYTIC CELLS

Louis Ferrand, Paris, France

Application May 22, 1951, Serial No. 227,545
Claims priority, application France December 29, 1945
7 Claims. (Cl. 204—223)

The present invention relates to fused salt electrolytic cells, and is an improvement in or modification of the invention described and claimed in the specification of my Patent No. 2,560,854, dated July 17, 1951. In the said specification, there has been described and claimed an apparatus for automatically controlling the operating conditions of electrolyzing a substance dissolved in a fused salt bath in a cell having a fixed sole, comprising a plurality of horizontal anodes having means for separately adjusting the vertical position of each end of each anode by means of a motor which is controlled in response to variations of voltage between the terminals of the cell to raise or lower the anodes to adjust the said voltage to lie between predetermined limits, and wherein an abnormal increase in said voltage operates means which cause the anodes to oscillate transversely and prevent any vertical adjustment of the anodes whilst the abnormal condition exists.

The arrangement therein described also includes means for maintaining each anode substantially horizontal, whereby the current will be uniformly distributed over an anode and also current responsive relays for adjusting the height of the individual anodes so that the current will be substantially equalised through all the anodes.

By means of that apparatus, two problems were solved namely:

(1) An electrical problem relating to the control of the voltage U across the terminals of the cell and of the current distribution between the various anodes.

(2) An electro-chemical problem relating to the control of adding material to be dissolved, account being taken of the total current I through the electrolyzer.

This present invention aims at resolving a different problem of regulation which involves three independent variables, viz.: U, I and T (the temperature of the bath), the latter in its turn being dependent on both the surrounding temperature and the efficiency of the electrolytic process, and this, both in natural-convection operating conditions (in which the working current is equal to the thermal-balance current) and in induced-convection operating conditions (in which a current is to be used which is higher than the thermal-balance current).

To this end, the present invention consists in an improvement in or modification of the apparatus as claimed in the specification of Patent No. 2,560,854, wherein for controlling the temperature of the bath in the cell a temperature controlling device is provided operating in priority to the means for vertically adjusting the anodes in response to variations of the voltage between the terminals of the cell. The said temperature controlling device preferably comprises a plurality of contact switches, a set of two relays being provided which co-operate with said temperature controlling means and are controlled by the contact switches thereof, the said two relays operating relays of the voltage controlling means so as to caues the anode-carrying bars to be lifted or lowered in dependence on temperature variations.

To make the invention clearly understood, reference will now be made to the accompanying drawings which are given by way of example and in which:

Fig. 1 is a circuit diagram of an arrangement of the invention for controlling the voltage, the current and the temperature when the bath in the cell is cooled by natural heat dissipation, only those parts of the circuit shown in the patent referred to above being illustrated which are necessary for the understanding of this invention; and

2

Figure 2:
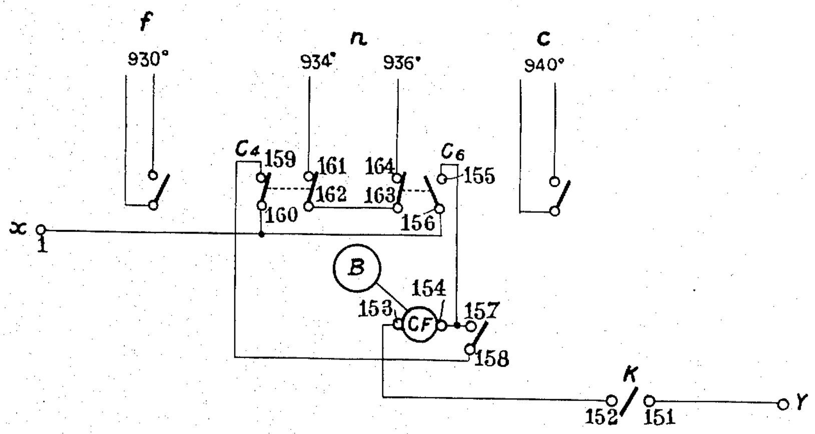

Fig. 2 illustrates modifications in the arrangement of Fig. 1 for controlling the voltage, the current and the temperature when cooling of the bath is artificially enforced.

All the contacts are shown in the figures in their unoperated positions.

I. OPERATION UNDER CONDITIONS OF BALANCED INTENSITY (NATURAL CONVECTION)

1. *Voltage regulation*

Under normal operating conditions, with the current intensity at a constant value, variations in voltage can only occur as a result of variations in the interpolar distance due to the electrode consumption failing to be exactly compensated for by a variation in the height of the metal. Moreover, where the alumina is not fed continuously or should the percentage of alumina in the bath fall below a certain limit, principally in the vicinity of the anodes, as a result of an insufficient rate of feed, there is danger that the "anode effect" will appear; the consequence is that to the normal causes of voltage variations resulting from electrode consumption there is added another cause of exceptional and intermittent character, which involves resorting to other means for the purpose of checking the development of working troubles and notably of temperature variations arising therefrom.

The problem of voltage regulation thus laid down is solved with the aid of several groups of members designed to perform separate functions, as follows:

1. Detecting members, constituted by highly sensitive relays capable of accurately detecting voltage variations in response to which orders are to be sent out by the same. Such elements are shown in Fig. 1 as a pair of relays RVP and RMU connected across the terminals of the voltage source U which is impressed across the cell, the former being adjusted to operate between a lower limit $U_1$ and an upper limit $U_2$ (that is, the nominal voltage $U_0 \pm 0.1$ volt), while the latter is adjusted to operate from a voltage $U_3$ (higher than $U_2$) upwards.

2. Order transmitting or selecting members or relays of a type capable of handling heavier currents. These are the auxiliary timed relays $m_u$ and $d_u$, which are characterized in that their operation, and hence the movements initiated thereby, will last for a predetermined time (30 to 60 seconds or so), depending upon how widely the voltage regulation limits $U_1$ and $U_2$ are spaced from one another. When the voltage is to be raised, the auxiliary relay $d_u$ will only be actuated through the medium of the delayed relay RT by which only those orders lasting for at least, say 60 seconds, whereas the emitting relay RMU whose duty it is to detect voltage variations over a limit $U_3$ (higher than $U_2$) upwards has no such delaying action relay associated therewith, so that its auxiliary relay $O_s$ will be energized as soon as the voltage reaches the value $U_3$. In such occurrences, the orders emitted by relay RVP, by which latter the same voltage variation was also detected, will remain unobeyed on account of the delay imposed upon the same by the delayed relay RT, it being understood that the delay in operation of RT is governed by the limit of operation $U_3$ of relay RMU with respect to $U_2$. On the contrary, when the question is that of raising a voltage that became too low, once the pointer of RVP has reached the lower voltage limit the voltage-raising orders emitted by RVP will be transmitted by the auxiliary relay $m_u$ without the interposition of any delaying relay.

3. Operating members whose duty is to perform the orders given by the emitting relays and transmitted through the auxiliary relays. As such, for the purpose of the problem under consideration, a pair of relays are used for the simultaneous switching-in of all the electrode-lifting motors pertaining to one and the same cell ($M_u$ for the lifting and $D_u$ for the lowering), said relays being controlled by two delayed-action switches such as $I_u$. For instance, if the voltage happens to rise to the upper limit $U_2$, the closing of contact 59—60 will at first result in the energization of the delayed action relay RT by connecting it with the voltage on line I through the circuit 51, 52, 53, 54, 55, 56, 57, 58, 59, 60, 61, 62, 63, 64, 65, following which (after a delay for which said relay RT is particularly set) the closing of the contact 66—67 will result in the energization of the delayed-action auxiliary relay $d_u$ through the circuit 61, 66, 67, 68, 63, 64, 65 and at the same time in the holding of the same due to the immediate closing of its holding contact 74—75 through the path 59, 69, 70, 71, 72, 73, 74, 75, 68, 63, 64, 65. Following the additional delay imposed by the delayed-action switch $I_u$, the third blade of the same will in turn close the contact 79—80, thus switching in such order-performing members as the switch-in relay $D_u$ by which all the anode-end position-adjusting units will be set into anode-lowering action through the circuit 59, 58, 76, 77, 78, 79, 80, 81.

4. Preclusive members designed to prevent any incompatibility of motion that might result from conflicting orders given by the various emitting relays. As such there are employed on one hand the auxiliary relay $O_s$ of the emitting relay RMU, whose duty is to set the electrodes into oscillating movement as will be described hereinafter and whose push-pull switch $I_s$ (which comprises two contacts either of which is closed while the other is open) cuts off the feed circuit for the remainder of the emitting relays as soon as the auxiliary relay $O_s$ is energized, so that no order can be transmitted to the anode-lifting motors after the anode effect in its initial phase has set the oscillating device into operation; and on the other hand, the feeding of the emitting relays of the voltage group and the temperature group (line I, Fig. 1) or of the current intensity group (line II) in successive cycles with the aid of a pair of separate lines that are switched in successively for predetermined periods with the aid of a periodic switch which does not form a part of the invention.

Last, it should be remarked that the auxiliary relay $O_s$ can be energized simultaneously or separately through a circuit through the pointer of relay RMU or through a circuit through switch C, which latter is lifted at the end of the working cycle of the revolving cam disc for the oscillating device (to be described later on) by a boss on said disc, so that until said disc has accomplished a complete revolution, to bring back the anodes into their original positions, the relay $O_s$ remains energized, even if in the meantime, with the cessation of the anode effect, relay RMU should have come again to its rest position.

For instance, upon the occurrence of the anode effect and the abrupt rising of the temperature up to the value $U_3$, the closing of the contact 83—84 of relay RMU will result in the energization of the auxiliary relay $O_s$ through the circuit 82, 83, 84, 91, 85 and then in the immediate opening of the contact 56—57 of which $I_s$, whereby relay RVP and the current-responsive relays are made inoperative; and owing to the immediate closing of the other contact 89—90 of said switch $I_s$ and to the closing of a further contact 166—167 the motor $M_2$ that actuates the cam disc P for the rocking of the anode-carrying shafts is put into action. The result is that even if the anode effect came to its end during the first revolution of the disc P (switch C being closed) the auxiliary relay $O_s$ would nevertheless remain energized, to complete its revolution, through the circuit 86, 87, 88, 89, 90, 91, 85 (as an alternative to the now open circuit 82, 83, 84, 91, 85) until the switch C (87—88) is lifted again by the cam on the disc P whose full revolution is now completed.

2. *Current distribution*

In accordance with my prior Patent No. 2,061,146, dated November 17, 1936, the current for each anode is fed to either end of a horizontal bar mounted in such manner that its top edge shall be exactly parallel with the bottom face of the anode, the minus pole of the electrolyzer being provided by the metal itself. Now, it will be obvious that the free surface of said metal is a horizontal plane. In order that the interpolar distance between the bottom face of the anodes and the metal shall be constant (which is absolutely required if the current is to be distributed uniformly at all points) it is necessary and sufficient that the bottom face and consequently the top edge be horizontal. This can be checked most easily with the aid of a simple mason's level.

For automatic control an electric level is available on each anode-carrying bar, which is represented in Fig. 1 by a movable member that will come into engagement with either stud $i_1$ or $i_2$ depending on whether the anode considered is lower at the left or the right. By means of such an electric level and through the medium of an auxiliary timed relay such as $m_l^2$ (Fig. 1) assigned to each electrode end, the switch-in relay of the corresponding anode-lifting motor or power means such as $M_l^2$ can thus be set into action, however only in the direction of lifting. For instance, in the case of an overload occurring on the right side, i. e. with the anode shaft dipping towards the right, the relay $m_l^2$ will be energized through the circuit 92, 55, 56, 57, 58, 76, 103, 93, 94, 95, 96 as long as relay RMU remains inoperative (contact 56—57 of switch $I_s$ being closed) immediately after which the said relay $m_l^2$ will be self-held owing to the closing of contact 101—102 of switch $I_l$ through the circuit 93, 97, 98, 99, 100, 101, 102, 95, 96 and finally, after the delay set in the relay has elapsed, the order-performing relay $M_l^2$ will become effective through the circuit 93, 103, 104, 105, 106 to set the corresponding anode-end position-adjusting unit into lifting action. A similar circuit and similar devices control the left end of the anode shaft and become effective upon the closing of contact $i_1$ of relay *g*. Horizontality being thus secured at each anode, equality in distribution of the current amongst the several anodes in one and the same electrolyzer cell remains to be provided for.

With this end in view, recourse is had to the voltage drop ascertained on one end of the anode-carrying bar between two points 1′ and 2′ (Fig. 1) that are equally spaced on all the bars. By means of a current-responsive relay RIA connected to those points by leads 1, 2 of Fig. 1 and assigned to each anode, and through the medium of a pair of auxiliary relays assigned to the anode considered, said voltage drop is made to act, as soon as it reaches the upper limit set up therefor, upon both switch-in relays for the corresponding pair of anode-lifting motors or power means, however, only in the direction of lifting.

It will be remarked that in such regulation of both the horizontality and the intensity, the anode-lifting motors can only be operated in the direction of lifting. This might lead to contradiction between the movements involved by voltage regulation. For the purpose of avoiding such contradictions, as outlined hereinbefore, the two groups of voltage- and current-responsive relays are energized separately and in successive cycles through two independent lines I and II (Fig. 1), so that they can never become operative at the same time.

However, such regulation of the intensity as described hereinbefore, which consists essentially in providing for horizontality of the electrodes and then for equality in distribution of the current as a whole amongst the same, would be insufficient to enable detecting certain troubles in operation that make themselves evident as abnormalities in the relative movement of the electrodes in one and the same electrolyzer cell which interfere with the efficiency of the current and thus with the thermochemical balance sheet, whereby consequent variations will be caused in the temperature of the bath.

The fact that a particular electrode sinks more rapidly than the adjacent ones means that a solidified portion of the bath has settled on that part of the sole which is located therebelow, which caused said electrode to be sunk deeper in order that the intensity may be kept at the same level. On the contrary, the fact that any particular electrode sinks more slowly than the adjacent ones is an evidence that conductive protuberances have formed at one or several places on its surface, whereby the flow of current becomes easier at said point or points, and which caused the electrode considered to be sunk more slowly in order that the intensity therethrough may remain the same.

For the purpose of revealing such abnormalities graduations are provided (not shown) by means of which it is possible at any moment to read the elevation of the anode-carrying shafts, and in particular to check the latter as to their horizontality.

Moreover, such direct reading of the heights enables one to plot the same against time and to check the curves of displacement of the anode ends as to their parallelism. Any abnormality in a curve, from the very instant when it occurs, will inform one about what happened at the anode concerned, and will indicate what steps are to be taken to restore normal conditions in the electrolytic process.

3. *Temperature regulation*

An indication has been given in the preamble of this specification of how important it is to properly regulate both the temperature and the composition of the bath in order to secure high efficiency in the electrolytic process, variations in such efficiency as well as in the surrounding temperature being liable to influence the temperature. One is thus confronted with a manifold problem. As a way to resolve the same, the group of emitting relays is complemented with a temperature regulator RGT in addition to the relays RVP, RMU, RIA and switch *g* and their co-operating relays, switches and the like described hereinbefore.

The regulator RGT operates three temperature responsive switches pertaining to precluding members, viz *f* "too cool" with e. g. a blue flash light signal 141 and a low-pitch sound warning signal $\alpha$; *n* "normal" with a steady orange light signal 64; *c* "too hot" with a red flash light signal 142 and a high-pitch sound warning signal $\beta$.

Belonging also to the group of detecting and emitting members are a pair of timed relays $P_1$ and $P_2$. Time-delay release relays $P_1$ and $P_2$ become respectively operative when the temperature reaches a lower limit $t_1$ or an upper limit $t_2$ to counteract such temperature variations by appropriate variations in the voltage and consequently in the power.

A threefold difficulty arises:

1. Contradiction may exist between signals given by the relay RVP and the relays $P_1$ and $P_2$ since abnormalities detected thereby have not the same causes, and this, all the more as when, for instance, the temperature of the bath measured by the thermocouple 174 is raised, the conductivity of the same will increase, whereby conditions being otherwise the same and in particular with unchanged total current, the voltage at the terminals of the cell will be reduced, thus urging relay RVP to raise the anodes whereas on the contrary and at the same time relay $P_2$ would give a signal to lower the same.

2. It may happen that the spontaneous decrease in voltage as will result e. g. from a rise in the bath temperature when due to a casual and transient cause will provide by itself, through the attending decrease in power if the current be kept constant, for the restoration of the temperature; in such circumstances, there is no need to cause relay $P_2$ to interfere, as the temperature will assume its normal value without any adjustment of the arrangement.

3. However, it may alternatively happen that a rise in the temperature of the bath is due to serious and persisting causes, on account either of a substantial increase in the surrounding temperature, or, on the contrary, of a serious trouble in the electrolytic process by which the thermal-chemical balance is upset in the direction of an increase in that portion of the power which plays a purely heat-generating part. It is not possible to rely upon the regulating members themselves as to what steps should be taken, and the skilled service of attendants has to be resorted to.

With a view to overcome this threefold difficulty the following means will be called into action and described under the same reference numerals 1, 2 and 3 as the results aimed at:

1. The switches *f*, *n* and *c* of the temperature regulator RGT and the pair of relays $P_1$ and $P_2$ are fed from the same auxiliary supply as the auxiliary relays of relay RVP (line I) so that line II (referred to in the parent specification) is assigned exclusively to the excess-current relays.

As explained above, the said two lines I and II are fed alternately with 110- or 220-volt current by means of device CP, its relay RCP and make and break switch $I_v$ a clockwork device for adjustable periods of time set down for each type of cell, the time of operation of line I being much longer than that of line II, and this, the more so as a high-capacity cell endowed with a comparatively large heat-momentum is concerned. The make and break switch $I_v$ is connected to the line I at 148.

The circuits involved are the following: the clockwork CP is effected by the circuit 143 (current line), 144, 145 and in the case of the drawing, the line II alone is alive by the circuit 143, 144, 149, 150, 171 for the shortest time of operation.

In that state of things, the essential principle is that temperature regulation is to be privileged, which means that no voltage regulation will be possible unless the bath is at normal temperature.

With that end in view the regulator RGT is so adjusted that switch *n* remains closed as long as the temperature of the bath remains between two limit values $t'$ and $t''$ which are the closer to the normal temperature $t$ as a sharper regulation is aimed at (for instance $t'=934°$ C. and $t''=936°$ C. with $t=935°$ C).

On the contrary, the excess current-responsive relays remain operative during those periods when line II assigned thereto is alive, whatever the temperature may be, since the current has to be suitably distributed at all times and so much the more as the temperature is an abnormal one.

As soon as the temperature of the bath becomes lower than $t'$ or higher than $t''$, the switch *n* opens, whereby the auxiliary relays $m_u$ and $d_u$ can no longer be energised and will thus remain inoperative even if relay RVP should respond to variations in the voltage.

In the event of substantial variations in temperature, for instance when the temperature of the bath should sink to its lower limit $t_1$, which is less than $t'$, the contact *f* is in turn closed and thus closes an energising circuit for relay $P_1$ and lights the blue flash-light signal. The relay $P_1$ is provided with a holding circuit by the closing of its upper contact $w_1$ over a key G. The relay $P_1$ remains energised for a predetermined time, whose duration is adjustable up to 90 seconds, with the result that by means of the auxiliary relay $m_u$ which is energised over the lower contacts $w_1$, the anodes are raised by a fixed amount. An analogous operation takes place following the closing of the switch *c* when the temperature reaches the upper limit $t_2$, which is higher than $t''$, whereby the anodes are lowered by means of the relays $P_2$, $d_u$ and $D_u$.

In particular, the circuits involved are as follows:

The relay $P_1$, and the lighting of the corresponding blue flash-light is effected by the circuits 107, 108, 109, 110, 111, 112, 113, 114, 115, 116, 117.

The relay $P_1$ is locked by the circuit 118, 119, 120, 121, 122, 113, 114, 115, 116, 117, the circuit being controlled by the key G.

Emitting an impulse of predetermined duration to operate the lifting relay $m_u$ is effected by the circuit 107, 108, 109, 110, 123, 124, 125, 126.

An analogous operation takes place for lowering the anodes when the contact *c* is closed whereby the relays $P_2$, $d_u$ and $D_u$ are operated. The relay $P_2$ is energized and the red flash light lighted by the circuit 107, 108, 109, 128, 129, 130, 116, 117; the relay $P_2$ is locked by the circuit 118, 119, 120, 131, 132, 130, 116, 117 the circuit being controlled by the key G; emitting an impulse of pre-determined duration to operate the lowering relay $d_u$ is effected by the circuit 107, 108, 133, 134, 135, 136, 137, 138, 139, 140, 68, 63, 64, 65.

It will be appreciated from the foregoing that the relay RVP can never cause a control effect while one of the relays $P_1$ and $P_2$ of the temperature regulator is operative.

2. In the temperature intervals $t_1 \rightarrow t'$ and $t'' \rightarrow t_2$ none of the above groups of relays can be operative since the three switches *f*, *n* and *c* are all open. The width of these "neutralized" zones to which a positive signalization by means of special lights could be assigned is determined in each particular case in accordance with the desired temperature steadiness and the size of the cell, the four following factors: time-delay of relays $P_1$ and $P_2$, width of the "neutralized" zones, duration of the cycle of operation of line I and weight of the bath, being closely interconnected.

These neutralized zones at either side of the normal temperature will enable the bath, in the event of unimportant deviations, to recover its normal temperature by a process of self-adjustment, the purpose of this being to avoid untimely correction.

3. From $t_1$ downwards and from $t_2$ upwards the operation of relays $P_1$ and $P_2$ results as explained in the lighting of the light signals and the lifting or lowering of the anodes by a fixed amount.

This first emergency step being taken and until it has become effective it is important that any other joint operation of the anodes should be precluded as long as an attendant in charge, warned by the light- or the sound-signals, has not attended to the cell.

For that purpose respective auxiliary contacts $z_1$ and $z_2$ of the relays $P_1$ and $P_2$ open when the corresponding relays are energized, so that any voltage regulation by RVP becomes impossible, even if in the meantime normal temperature should have been restored and switch *n* closed as a result of such variations in power as would have been imposed upon the cells by the relays $P_1$ and $P_2$.

Three different situations may arise:

(*a*) If the normal temperature has re-established itself (the orange light operating) under the control effect of the relay $P_1$ or $P_2$, control of the voltage may, again, take place by means of the relay RVP after the key G has been operated to de-energize the relays $P_1$ and $P_2$ by opening the contact 119, 120, whereupon the locking contacts $w_1$ and $w_2$ are opened and simultaneously the auxiliary contacts $z_1$ and $z_2$ are closed. The relays $P_1$ and $P_2$ are again ready for controlling the temperature when the contacts 119, 120 are re-closed by means of the key G.

(*b*) If the deviation of the temperature persists (the red or blue light operating), it is necessary first to switch over from automatic to manual control (by means not shown) whereby the arrangement described is rendered inoperative, and then to attend to the cell until normal temperature has been restored, whereupon the arrangement is switched back from manual to automatic control.

(*c*) When the temperature lies within the neutralized zone (no signalling light operating) no danger arises by waiting to see if the temperature restores itself whereupon the procedure of section (*a*) is performed, since otherwise the relays $P_1$ and $P_2$ cannot respond to cause another control effect, the control of the voltage remaining suspended although the orange light is not operating. If it is essential that normal conditions be restored as quickly as possible, the procedure of section (*b*) may be performed and subsequently that of section (*a*) after the normal temperature has been restored.

II. When it is intended to work at a current value higher than that at which thermal balance is secured, e. g. temporarily in low net load conditions, or permanently for an increased production, it is obvious that the thermal balance will be interfered with thereby and that it will not be possible to restore it by influencing the interpolar distance, which is assumed to be set at the minimum consistent with satisfactory current efficiency.

It is then necessary to resort to induced convection by means of air blown into or water circulated through cooling tubes in the sole or the walls of the cell.

In that case the three fold regulation is carried out as described hereinbefore, on the only condition that first the emitting relays have been properly set as to voltage and current. This involves that the air or water feed to be employed to provide for thermal balance at the new current value used is well defined.

If such feed is but imperfectly known, cooling should be performed by the in-and-out method and a slight fluctuation of the temperature between the limits $t'$ and $t''$ by which the zone of normal temperature is defined should be accepted. In that case the switch *n* should be arranged and supplemented as shown in Fig. 2.

As a result of that supplementary arrangement the switch *n* is composed, instead of a simple switch of a pair of double-pole switches one of which, $C_4$, is an ordinary double-pole break contact switch assigned to 934° C. while the other $C_6$ assigned to 936° C., is a make and break switch contact combination of which the two contacts cannot both be closed at the same time. A switch-in-relay CF operates the air-blower $\beta$ as soon as the temperature exceeds 936° C. provided the key K closes the contacts 151, 152.

In the closed position of switch *n*, which is the one shown in Fig. 2, voltage regulation is possible (between 934 and 936° C.) by means of the circuit 161, 162, 163, 164, which replaces the contact 53 of Fig. 1.

As soon as the temperature exceeds 936° C. as a result of the current applied and long before it reaches 940° C. (which would set relay $P_2$ into action and cause the lowering of the electrodes) switch *n* by opening closes the make contacts 155, 156 of the make and break switch $C_6$ whereby the air blower switch-in relay CF becomes energized by the circuit 151, 152, 153, 154, 155, 156 and locks itself by its contacts 157, 158.

The air-blower $\beta$ is started by the relay CF and the temperature of the bath ceases to rise, and subsequently decreases past 936° C. without stoppage of the air-blower, since (although the switch $C_6$ is again opened as shown in Fig. 2), nevertheless the relay CF is still energized through its locking contact and the holding circuit 151, 152, 153, 154, 157, 158, 159, 160.

Upon the temperature sinking below 934° C. the switch $C_4$ opens at both contacts thereof and opens the supply current to the switch CF at 159, 160. The air-blower $\beta$ comes to rest and the temperature stops sinking long before it can reach 930° C. and thereby cause the operation of relay $P_1$; subsequently, the temperature rises again until it reaches 936° C. and starts again to operate the air-blower. The above-described system is connected into line I at $X_1$ and Y.

A temperature regulation is thus obtained in induced convection conditions which may be less accurate (since it is liable to vary between 934 and 936° C. in the example taken) but which is more convenient since the air-blower $\beta$ can be run at full capacity without adjusting its supply current. The curve of temperature is a sinusoid of 2° amplitude, the heating periods being the longer and the cooling periods the shorter as the excess current is less.

This application is a continuation-in-part of my application Serial No. 684,066, filed July 16, 1946, now Patent No. 2,560,854, dated July 17, 1951.

What I claim is:

1. In a cell for the electrolysis of molten salts comprising a fixed sole, a plurality of normally horizontal current conductive rock shafts mounted for axial rotation above said sole, anodes depending from said shafts and extending towards said sole, power means for controlling the vertical position of the ends of said shafts, power mechanism for rocking said shafts upon their axes to provide an oscillatory motion of said anodes, a first voltage-responsive relay connected for operation in accordance with the voltage across said cell, circuit means connecting said first relay and said power means for controlling the latter, a second voltage-responsive relay connected across the cell terminals, connections from said second relay to said power mechanism to control the latter, and means responsive to the condition of said second relay for rendering the operation of said first relay ineffective to energize said power means during operation of said power mechanism, the improvement which comprises means for sensing the temperature of said cell, means controlled by said temperature sensing means for breaking the circuit to said first voltage-responsive relay when the temperature of the cell passes outside predetermined limits, whereby said first voltage-responsive relay is rendered ineffective when said temperature lies outside said limits, switch means adapted to be actuated by said temperature sensing means when said temperature departs from said limits to make the circuit to said power means for controlling the height of the ends of said anode shafts, said switch means energizing said power means to lift said anodes when said temperature falls below said limits and to lower said anodes when said temperature rises above said limits.

2. In a cell for the electrolysis of molten salts comprising a fixed sole, a plurality of normally horizontal current conductive rock shafts mounted for axial rotation above said sole, anodes depending from said shafts and extending towards said sole, power means for controlling the vertical position of the ends of said shafts, power mechanism for rocking said shafts upon their axes to provide an oscillatory motion of said anodes, a first voltage-responsive relay connected for operation in accordance with the voltage across said cell, circuit means connecting said first relay and said power means for controlling the latter, a second voltage-responsive relay connected across the cell terminals, connections from said second relay to said power mechanism to control the latter, and means responsive to the condition of said second relay for rendering the operation of said first relay ineffective to energize said power means during operation of said power mechanism, the improvement which comprises means for sensing the temperature of said cell, means controlled by said temperature sensing means for breaking the circuit to said first voltage-responsive relay when the temperature of the cell passes outside predetermined limits, whereby said first voltage-responsive relay is rendered ineffective when said temperature lies outside said limits, switch means adapted to be actuated by said temperature sensing means when said temperature departs from said limits to make the circuit to said power means for controlling the height of the ends of said anode shafts, said switch means energizing said power means to lift said anodes when said temperature falls below said limits and to lower said anodes when said temperature rises above said limits, and means including a clockwork and means controlled thereby for cyclically deactivating said temperature sensing means for predetermined intervals of time.

3. The combination defined in claim 1, wherein said temperature sensing means includes an upper-limit temperature-responsive switch actuatable when the temperature of the cell exceeds a predetermined upper-limit temperature, and a lower-limit temperature-responsive switch actuatable when the temperature of the cell falls below a predetermined lower-limit temperature, and wherein said means controlled by said temperature-sensing means for breaking the circuit to said first voltage-responsive relay includes a contact of said upper-limit switch and a contact of said lower-limit switch, and wherein said switch means includes a key switch, a first time-delay relay energized by said upper-limit switch across said key switch to close a circuit to said power means for a predetermined time to cause the anode to be lowered for a predetermined distance when the temperature of the bath exceeds the upper-limit temperature, and a second time-delay relay energized by said lower-limit switch across said key switch to close a circuit to said power means for a predetermined time to cause the anode to be raised for a predetermined distance when the temperature of the bath falls below the lower-limit temperature.

4. The combination defined in claim 1, wherein said temperature sensing means includes an upper-limit temperature-responsive switch actuatable when the temperature of the cell exceeds a predetermined upper-limit temperature, and wherein said means controlled by said temperature-sensing means for breaking the circuit to said first voltage-responsive relay includes a contact of said upper-limit switch, and wherein said switch means includes a key switch, a time-delay relay energized by said upper-limit switch across said key switch to close a circuit to said power means for a predetermined time to cause the anode to be lowered for a predetermined distance when the temperature of the bath exceeds the upper-limit temperature.

5. The combination defined in claim 1, wherein said temperature sensing means includes a lower-limit temperature-responsive switch actuatable when the temperature of the cell falls below a predetermined lower-limit temperature, and wherein said means controlled by said temperature-sensing means for breaking the circuit to said first voltage-responsive relay includes a contact of said lower-limit switch and wherein said switch means includes a key switch, a time-delay relay energized by said lower-limit switch across said key switch to close a circuit to said power means for a predetermined time to cause the anode to be raised for a predetermined distance when the temperature of the bath falls below the lower-limit temperature.

6. The combination defined in claim 1, further comprising means for causing circulation of a heat transfer medium in said cell to control the cell temperature, and switch means actuated by said temperature-sensing means when the cell temperature exceeds a predetermined upper value, said switch being in the circuit to said circulating means and energizing said circulating means when actuated, said predetermined upper value being less than the highest temperature in said first-named temperature limits.

7. The combination defined in claim 1, further comprising means for causing circulation of a heat transfer medium in said cell to control the cell temperature, first switch means actuated by said temperature-sensing means when the cell temperature exceeds a predetermined upper value, said switch being in the circuit to said circulating means and energizing said circulating means when actuated, and second switch means actuated by said temperature-sensing means when the cell temperature falls below a predetermined lower value, to said second switch also being in the circuit to said circulating means and deenergizing said circulating means when actuated, said upper value and said lower value defining a temperature range less than said first-named temperature limits.

References Cited in the file of this patent

UNITED STATES PATENTS

| | | |
|---|---|---|
| 2,061,146 | Ferrand | Nov. 17, 1936 |
| 2,560,854 | Ferrand | July 17, 1951 |